Figure 1:
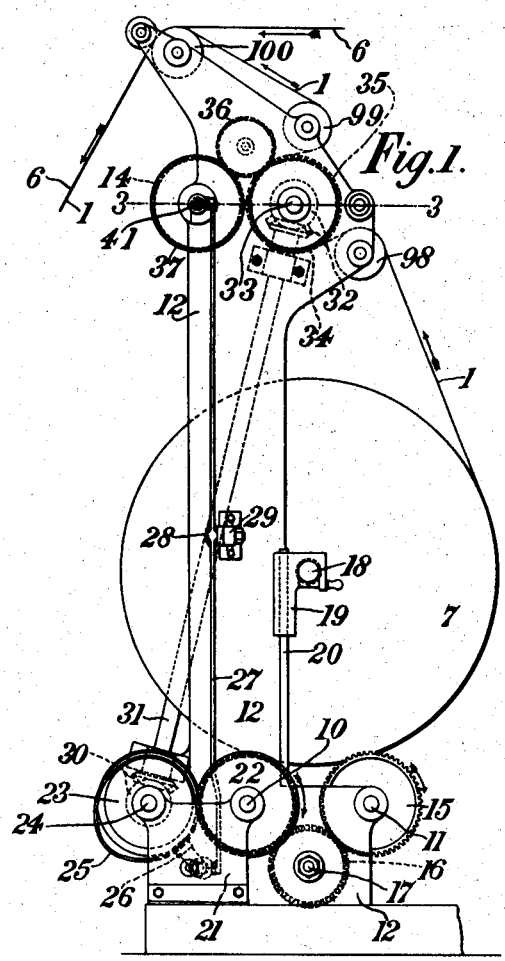

No. 773,517. PATENTED OCT. 25, 1904.
T. M. NORTH.
APPARATUS FOR AUTOMATICALLY CONTROLLING THE UNWINDING
OF ROLLS OF PAPER.
APPLICATION FILED FEB. 9, 1904.
NO MODEL. 8 SHEETS—SHEET 1.

Witnesses
Inventor
Thomas Merrifield North.
per Chas. S. Woodroffe
Attorney

No. 773,517. PATENTED OCT. 25, 1904.
T. M. NORTH.
APPARATUS FOR AUTOMATICALLY CONTROLLING THE UNWINDING
OF ROLLS OF PAPER.
APPLICATION FILED FEB. 9, 1904.
NO MODEL. 8 SHEETS—SHEET 2

Witnesses
Inventor
Thomas Merrifield North
per Chas. S. Woodroffe
Attorney

No. 773,517. PATENTED OCT. 25, 1904.
T. M. NORTH.
APPARATUS FOR AUTOMATICALLY CONTROLLING THE UNWINDING
OF ROLLS OF PAPER.
APPLICATION FILED FEB. 9, 1904.
NO MODEL. 8 SHEETS—SHEET 3.
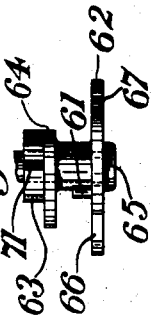
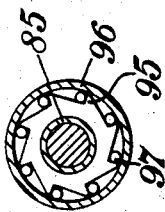
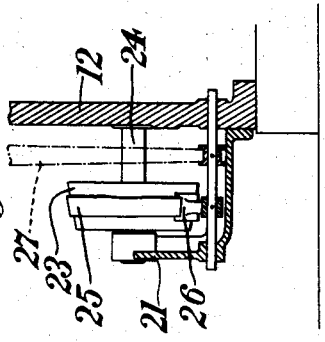
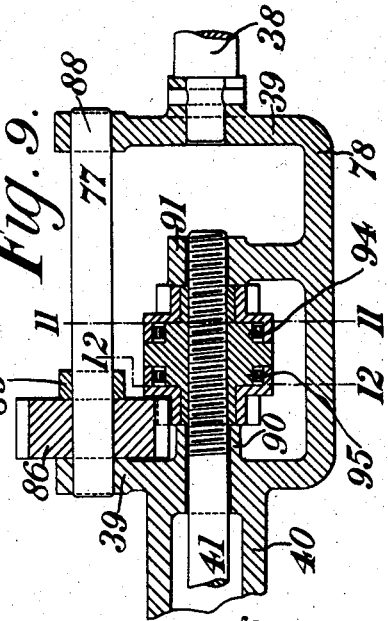
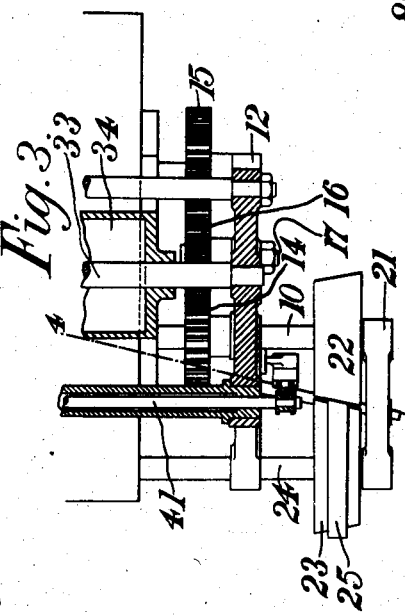
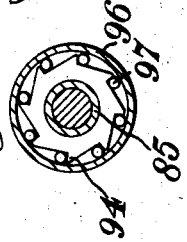

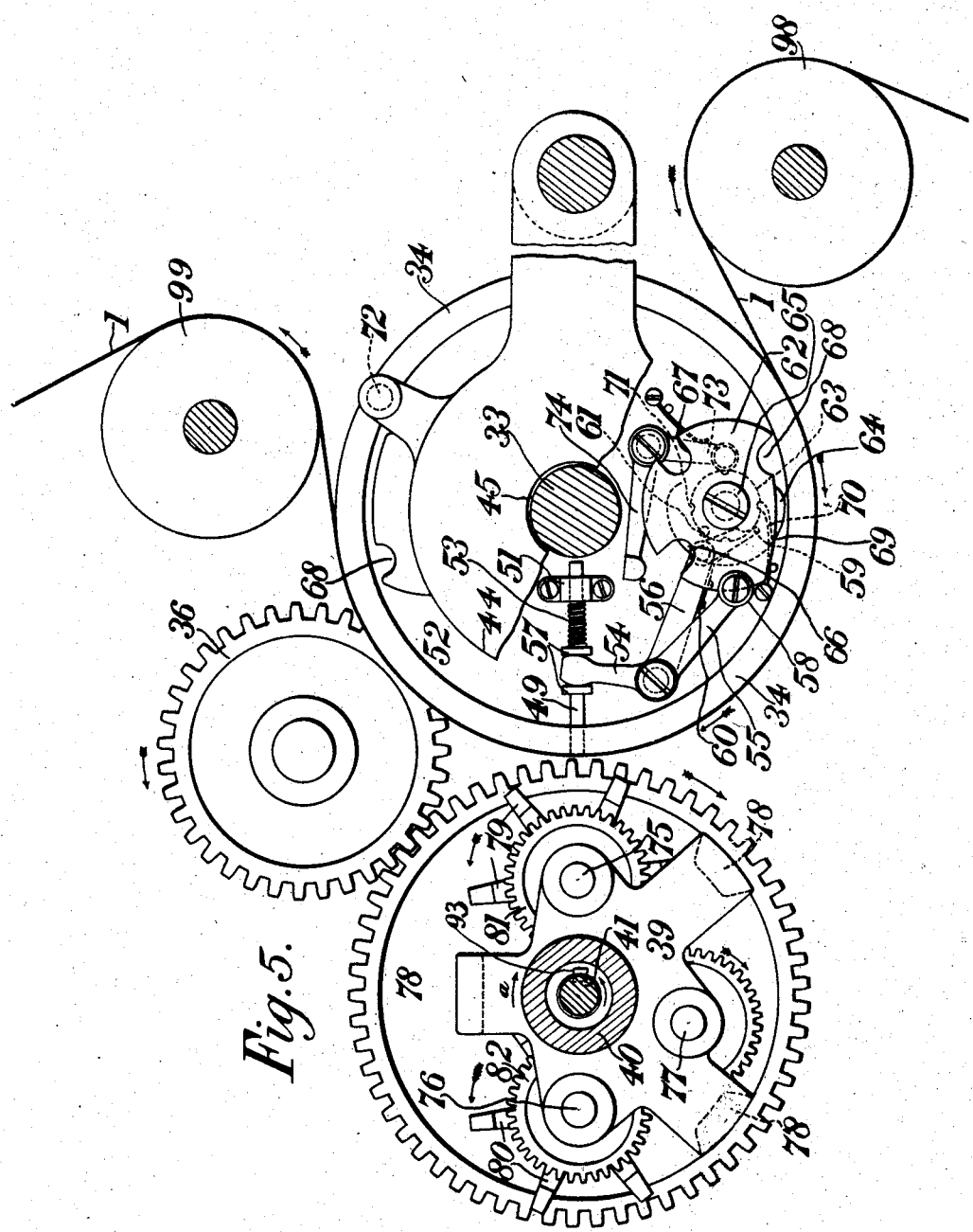

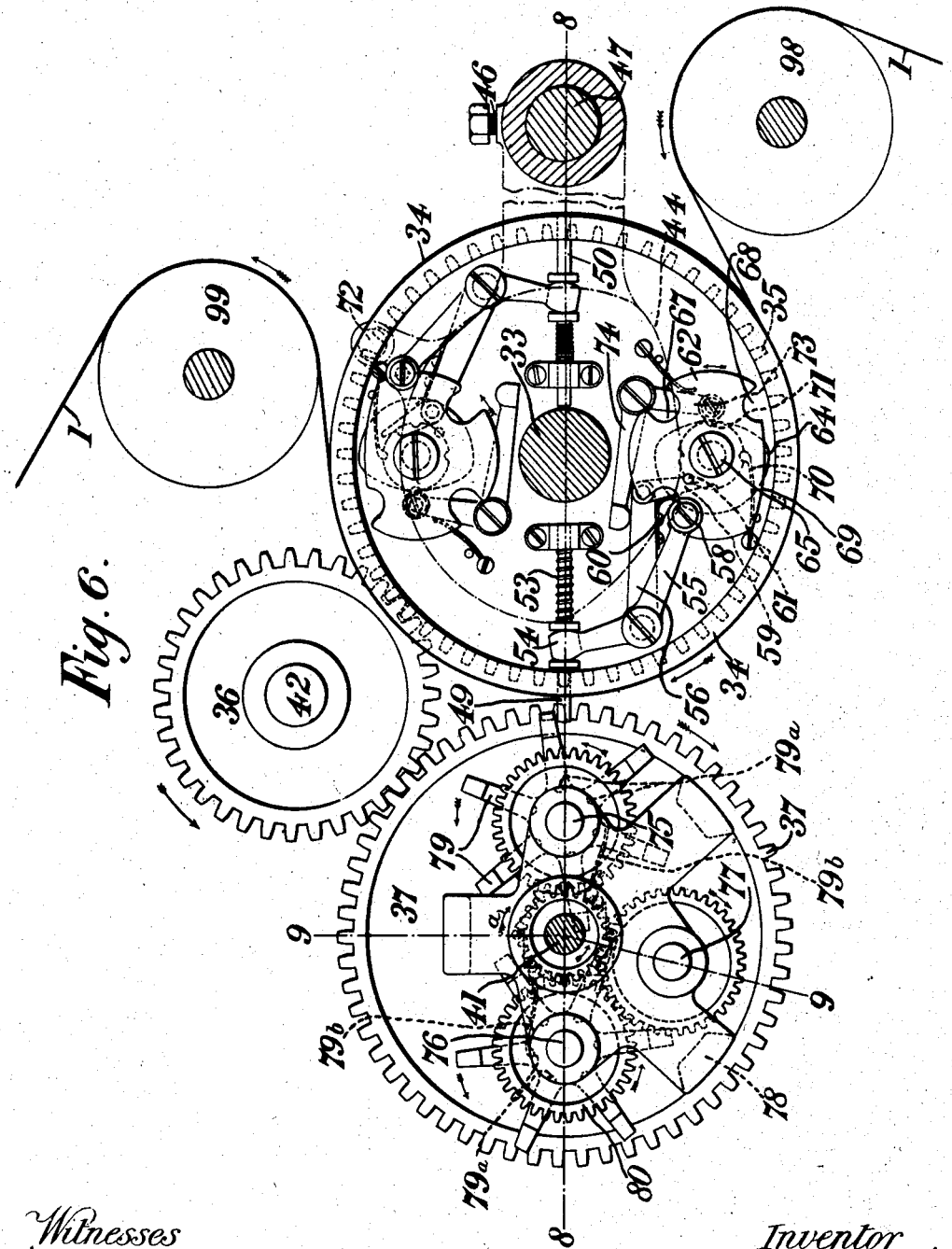

No. 773,517. PATENTED OCT. 25, 1904.
T. M. NORTH.
APPARATUS FOR AUTOMATICALLY CONTROLLING THE UNWINDING
OF ROLLS OF PAPER.
APPLICATION FILED FEB. 9, 1904.
NO MODEL. 8 SHEETS—SHEET 6.
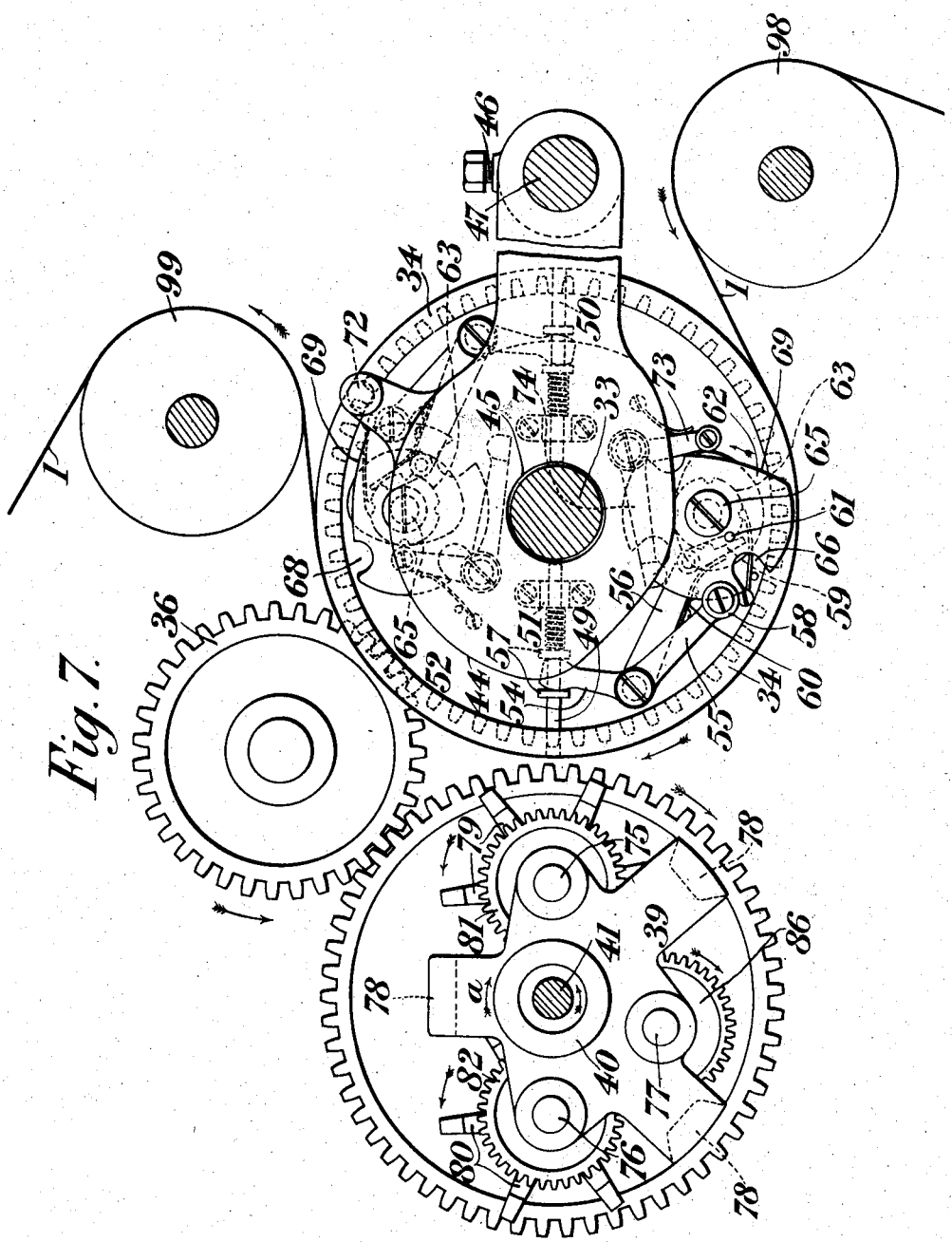

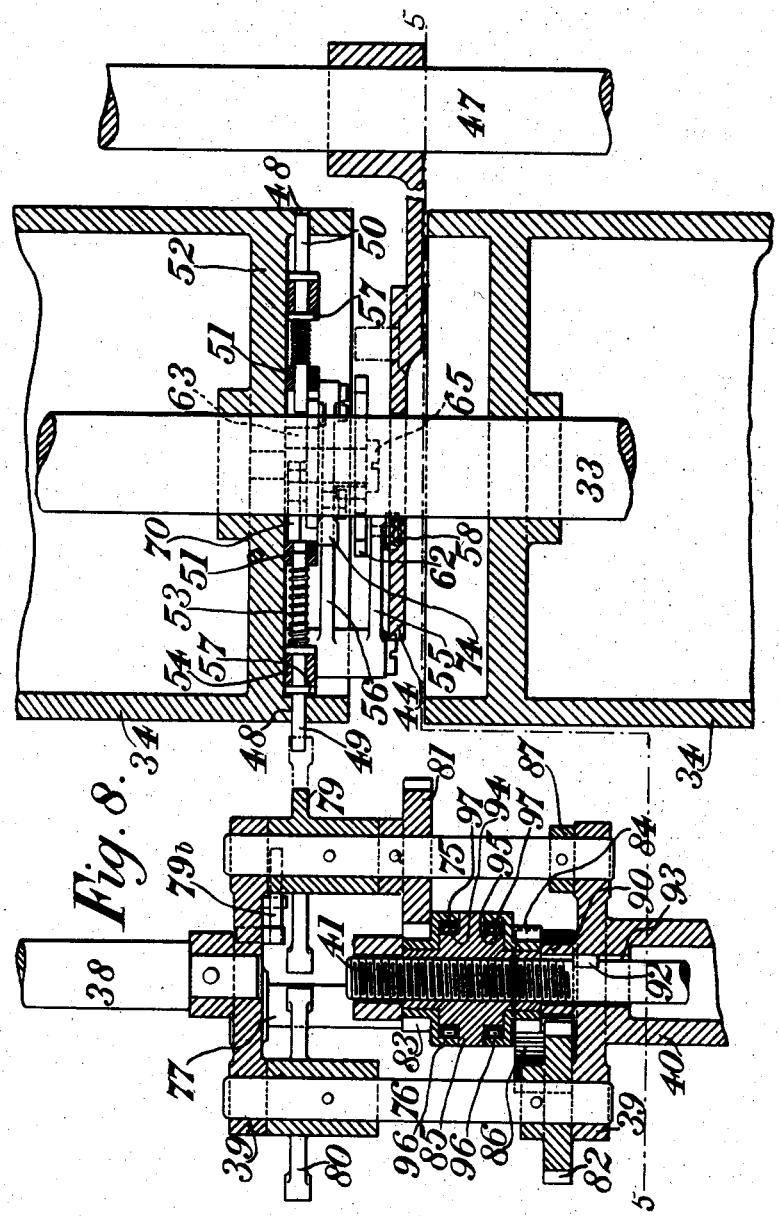

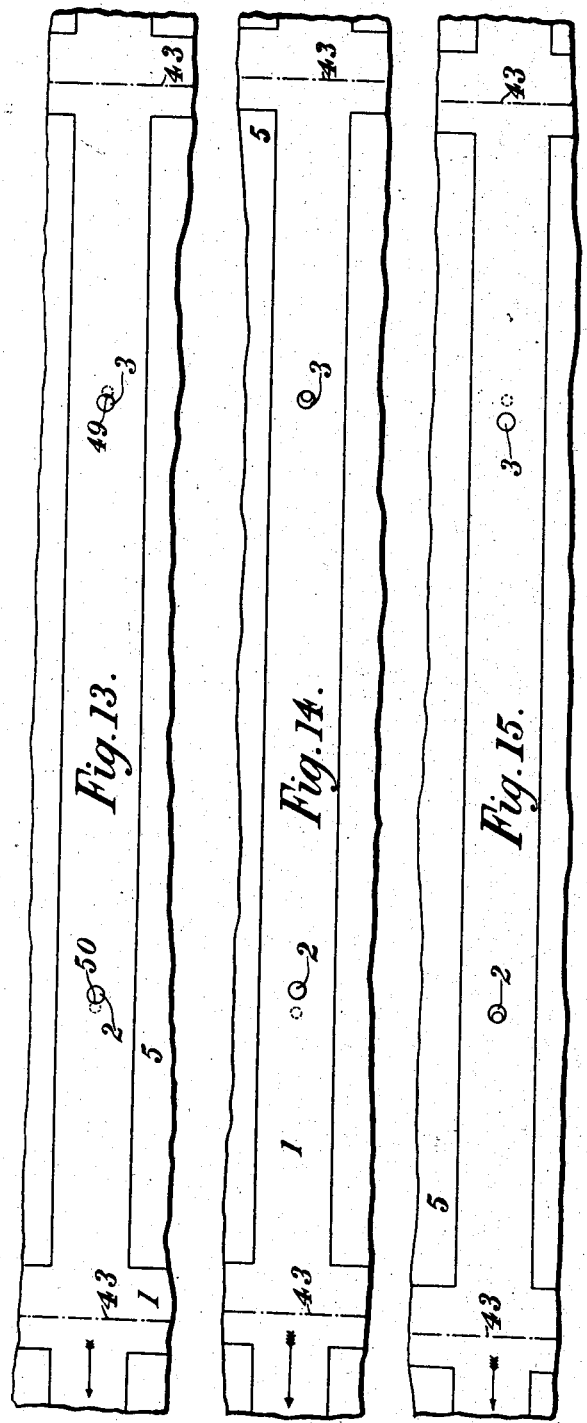

No. 773,517. Patented October 25, 1904.

UNITED STATES PATENT OFFICE.

THOMAS M. NORTH, OF ALTRINCHAM, ENGLAND, ASSIGNOR TO LINOTYPE AND MACHINERY LIMITED, OF LONDON, ENGLAND, A COMPANY.

APPARATUS FOR AUTOMATICALLY CONTROLLING THE UNWINDING OF ROLLS OF PAPER.

SPECIFICATION forming part of Letters Patent No. 773,517, dated October 25, 1904.

Application filed February 9, 1904. Serial No. 192,794. (No model.)

*To all whom it may concern:*

Be it known that I, THOMAS MERRIFIELD NORTH, a subject of the King of Great Britain and Ireland, and a resident of Altrincham, in the county of Chester, England, have invented certain new and useful Apparatus for Automatically Controlling the Unwinding of Rolls of Paper; and I do hereby declare the following to be a full, clear, and exact description of the invention, such as will enable others skilled in the art to which it appertains to make and use the same.

When it is desired to produce a newspaper of ten or twelve pages in printing and folding machines adapted normally to produce a newspaper of, say, eight pages, the extra number of pages must be printed and rewound into a roll beforehand and afterward unwound from this roll and run in and associated with the paper on which the main printing is effected. This operation has hitherto necessitated the constant and most careful attention of the operator in order that the cutting of the said sheets may be effected at or about the middle of the transverse margins, it being almost impossible to unwind a roll so that the said middle parts of the margins shall always be presented to the knives at the proper instant. In these machines means have generally been provided whereby the operator may cause the unwinding of the previously-rewound roll to be accelerated or retarded, according to whether the web of this roll is in arrear or advance of its proper position relatively to the knives; but as this regulation has been entirely dependent upon the keenness of sight and dexterity of the attendant the results have been far from satisfactory.

The object of the present invention is to provide means which will enable the above-mentioned adjustment of the web to be automatically effected.

For convenience of description the word "inset" is hereinafter applied to the above-named extra pages and to the web, roll, and printing appropriate thereto, and the word "main" is applied to the pages to which the said extra ones are added and to the web, roll, and printing appropriate to such main pages.

The invention will be best understood by reference to the accompanying drawings, which are to be taken as part of this specification and read therewith, and in which drawings—

Figure 2:
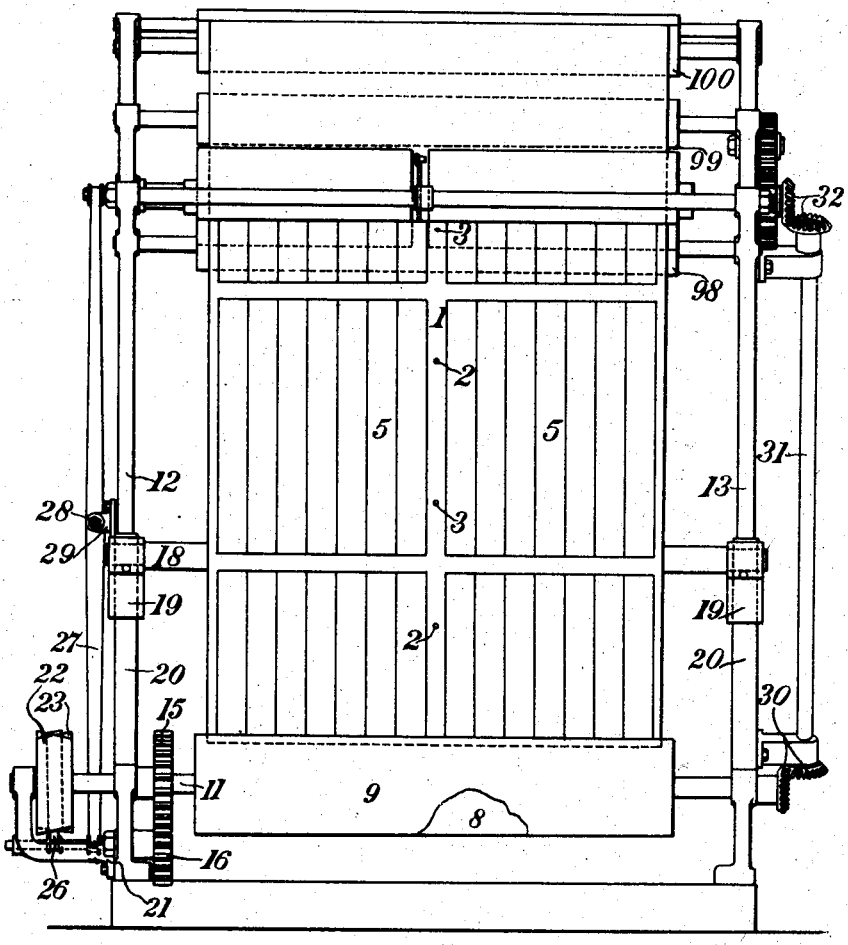

Figure 1 is a front elevation of an improved unwinding machine constructed according to the present invention. Fig. 2 is an end elevation of the same as seen from the right hand of Fig. 1. Fig. 3 is a view, partly in plan and partly in horizontal section, on the line 3 3 of Fig. 1. Fig. 4 is a part-sectional elevation on the line 4 4 of Fig. 3 looking in the direction indicated by the arrow in that figure. Fig. 5 is a sectional elevation on the line 5 5 of Fig. 8 with a part broken away so as to expose other parts which would otherwise be obscured. Figs. 6 and 7 are views generally similar to Fig. 5, but showing the parts in different operative positions. Fig. 8 is a horizontal section on the line 8 8 of Fig. 6. Fig. 9 is a section on the line 9 9 of Fig. 6. Fig. 10 is a plan of a detached portion of the mechanism shown in Figs. 5, 6, 7, and 8. Figs. 11 and 12 are part-vertical sections taken, respectively, on the lines 11 11 and 12 12 of Fig. 9. Fig. 13 is a plan of a portion of an inset-web in its correct position. Fig. 14 is a plan of a portion of an inset-web in arrear of its correct position; and Fig. 15 is a view similar to Figs. 13 and 14, showing the inset-web in advance of its correct position.

According to this invention for each sheet to be cut from the inset-web 1 two holes 2 3 are punched in the margin thereof, preferably the center margin 4, as shown in Figs. 2, 13, 14, and 15, while the said sheet is being printed, the holes at every part of the web bearing exactly the same relation to the printed matter 5 adjacent thereto. These holes 2 3, as hereinafter described, serve for automatically effecting the control of the web's travel.

In the accompanying drawings the printing matter 5 is not represented as such. The sites occupied by it are indicated merely in outline, the other lines appearing in Fig. 2 being added to indicate the arrangement of the columns.

The unwinding apparatus, which is shown in its entirety in Figs. 1 and 2 and with which the above-named controlling means are incorporated, is situated, preferably, between the printing-press and the cutting and folding mechanism, none of which form part of the present invention and are therefore not represented in the accompanying drawings. The main web 6, Fig. 1, and the inset-web 1 are led, respectively, from the said press and unwinding apparatus directly to the folding and cutting mechanism.

In the unwinding apparatus the inset-roll 7 to be unwound rests upon two cylinders 8 9, Fig. 2, the respective shafts 10 and 11 of which are supported in the two side frames 12 and 13 of the machine and are geared together through spur-wheels 14 15, fast on the said shafts, respectively, and an intermediate wheel 16, running loosely upon a short shaft or stud 17, Fig. 1, fast in the frame 12. By these means the two cylinders 8 and 9 are caused to rotate in the same direction, as indicated by the arrows in Fig. 1, and at the same peripheral speed, which latter, however, is automatically varied through the intermediary of the above-mentioned holes 2 3 in the inset-web 1, as hereinafter more fully explained. The spindle 18, on which the roll 7 is mounted, is journaled in two shoes 19, free to move vertically on guides 20 on the two side frames 12 and 13 in the ordinary well-known manner.

At one end the shaft 10 projects outward beyond the frame 12 and is free to rotate in a bearing-standard 21. On this shaft 10 and between the frame 12 and standard 21 is secured a conical pulley 22, situated with its periphery closely adjacent to that of another conical pulley, 23, fast on a shaft 24, driven positively by any suitable means. (Not represented in the drawings.) The said shaft 24 may, for example, be conveniently driven from either the press or the folder, and it is supported and free to rotate in bearings in the two side frames 12 13 and standard 21 or in any other suitable manner. The larger end of each conical pulley 22 23 is adjacent to the smaller end of the companion pulley, and around the positively-driven (or, as it is herein called, "first") pulley 23 is loosely encircled a strap 25, which is nipped between and in frictional contact with that pulley (23) and the other or second pulley 22. This strap 25 is capable of being adjusted edgewise for varying the speed of rotation of the second pulley 22 in relation to that of the first one, 23, and for that purpose it is engaged with a strap-shifter 26, Figs. 1, 2, and 4, connected to the lower end of a lever 27, pivoted at 28 to a bracket 29, fast to the adjacent side frame 12 and to whose upper end is suitably connected a screw-threaded rod 41, hereinafter more particularly referred to.

The before-mentioned shaft 24, through miter-gearing 30, an upstanding shaft 31, and miter-gearing 32, is in operative connection with the shaft 33 of a horizontal registering-cylinder 34. The shaft 33 is journaled in the upper part of the two side frames 12 13 and through suitable gearing 35 36 37 rotates (at the same speed and in the same direction as its own rotation) a horizontal shaft 38, secured to one end of a body or cage 39, whose other end is supported by a coaxial hollow shaft 40, concentrically within which is situated the before-mentioned screw-threaded rod 41. The two coaxial shafts 38 40 of the cage 39 are suitably journaled in the two side frames 12 13, their common axis being parallel with the axis of the registering-cylinder 34. Of the above-named gearing 35, 36, and 37 the spur-wheel 35 is rigidly secured on the shaft 33, the intermediate wheel 36 is free to rotate on a stud 42, fast to the side frame 13, and the wheel 37 is fast on the shaft 38 of the cage 39.

The registering-cylinder 34 and the cage 39 are timed to make one complete rotation (in the directions indicated by the arrows in Figs. 5, 6, and 7) for each sheet to be cut from the web 1. The circumference of the registering-cylinder 34 is equal to the length of each inset-sheet—that is to say, the length represented by the distance between the two dotted lines 43 in each of the Figs. 13, 14, and 15, and, as shown in Fig. 8, in which figure only the central part of the registering-cylinder 34 is represented, that cylinder is formed in two coaxial parts, both rigidly secured to the same shaft 33 and at a sufficient distance from each other to accommodate between them a stationary cam 44. This cam 44 is provided with an opening 45, within which the shaft 33 is free to rotate without contact, and the said cam is rigidly secured by a bolt 46 or otherwise to a bar 47, rigidly supported by the two side frames 12 13. One of the cylinder parts (in the example represented it is the rear part) is provided with two diametrically opposite holes 48, each for receiving the outer end of a pin 49 or 50, capable of sliding therethrough and through a guide 51, fixed to the end wall or head 52 of the said cylinder part, this sliding motion being in the direction of the axis of the pin 49 or 50 and radial to the cylinder-shaft 33.

Each of the sliding pins 49 50 is acted on by a spring 53, which always tends to move it into its outermost position, in which latter (see the pin 49 in Figs. 6 and 8) its outer end projects beyond the periphery of the registering-cylinder 34. When the pins 49 50 are not projected outward by the springs 53, their outer ends do not extend beyond the periphery of the registering-cylinder. The sliding pins 49 50 are also acted upon by independent withdrawing mechanisms mounted on the cylinder-head 52 diametrically opposite each other. As each of these mechanisms is similar in construction and operation to the other, the following description of one is equally applicable to both.

The sliding pin—say the pin 49—is engaged with the vibrating end of one arm, 54, of a three-armed lever 54 55 56, pivoted to the cylinder-head 52, this arm being forked and engaging between two collars 57, fast on the pin 49. A second arm, 55, of the lever 54 55 56 is provided with an antifriction-roller 58, adapted to travel upon the periphery of the above-named stationary cam 44, while the third arm, 56, has pivoted to it a pawl 59, which is acted upon by a spring 60, secured to the said arm 56 and is adapted to engage a crank-pin 61, projecting from a tumbler-disk 62. This tumbler-disk, as shown most clearly in Fig. 10, is formed, preferably, integrally with a grooved locking-ring 63 and an edge cam 64 and is capable of rotating upon a stud 65, fixed in the cylinder-head 52, and it is provided with three peripheral recesses 66 67 68, situated at ninety degrees apart, and a mutilated or flattened portion 69 between the peripheral recesses 66 and 68 and adjoining the last-named recess, as shown in Figs. 5, 6, and 7. A spring-detent 70, mounted on the cylinder-head 52, engages with the grooves 71 of the locking-ring 63 to retain the tumber-disk 62 in any of its definite positions until it is positively moved from such positions, as next described. On the stationary cam 44 or the bracket carrying the same is provided a stud or abutment 72, which projects into the path of the tumbler-disk 62, so that the peripheral recesses 66 67 68 of the latter may at successive revolutions of the said disk about the axis of the shaft 33 successively engage with the stud 72, and thereby cause the tumbler-disk 62 and the locking-ring 63 and cam 64, connected thereto, for each such engagement to be turned about the axis of the stud 65 through an angle of ninety degrees. The cam 64 is adapted to operate on one arm, 73, of a spring-controlled bell-crank lever 73 74, pivoted on the cylinder-head 52, and whose other arm, 74, is adapted to act on the before-mentioned pawl-carrying arm 56, as shown in Figs. 6, 7, and 8, so as to retain the sliding pin 49 in its withdrawn position during the time that the three-armed lever 54 55 56 is out of operative contact with the stationary cam 44.

The before-mentioned rotating body or cage 39 carries two short shafts 75 76, parallel with and on diametrically opposite sides of the common axis of the before-mentioned shafts 38 40, and a third short shaft 77, the shafts 75 76 being rotatably and the shaft 77 non-rotatably supported in the two ends of the said cage. These two cage ends are connected by three rigid bars 78, parallel with the axis about which the cage rotates and constituting integral parts of the cage. On each of the two diametrically-opposed shafts 75 76 is secured a star-wheel 79 80, respectively, the free ends of whose arms are adapted to project into the path of the before-described sliding pins 49 50 of the registering-cylinder 34, and there is also secured thereon a spur-wheel 81 82, respectively, gearing with a pinion 83 84, respectively, adapted to rotate freely upon one end of a nut 85, fitting on the before-described screwed rod 41, as shown most clearly in Figs. 8 and 9. The spur-wheel 81 on the shaft 75 is in direct engagement with its pinion 83; but the other spur-wheel, 82, engages its pinion 84 through an intermediate wheel 86, mounted on the shaft 77. By these means the rotation of each star-wheel 79 80 about its axis will cause the nut 85 to rotate in a direction the reverse of that due to the rotation of the other of such star-wheels about its axis. The shaft 75 is prevented from moving longitudinally in the cage 39 by the star-wheel 79 and a collar 87, both fast on the said shaft and abutting against opposite ends of the cage, and, similarly, by the wheels 80 and 82 abutting against the two ends of the cage 39 the shaft 76 is prevented from moving endwise therein. The shaft 77 is secured in the rotating body or cage 39 by a screw 88, (shown in dotted lines in Fig. 9,) which prevents its rotation, and the wheel 86 is free to rotate on the said shaft and is prevented from moving sidewise thereon by being juxtaposed between one end of the cage and a collar 89, rigidly secured on the shaft in any suitable manner.

The bosses of the two star-wheels 79 80 are provided with peripheral grooves 79$^a$, (shown in dotted lines in Fig. 6,) with which engage spring-detents 79$^b$. (Shown in dotted lines in Fig. 6 and one of which is also shown in full lines in Fig. 8.) These devices serve for retaining the star-wheels in any position to which they may be rotated by contact with the sliding pins 48 49.

The nut 85 is prevented from moving longitudinally in the cage 39 by bearing at one end against a boss 90, formed on one of the cage ends, and at its other end against a boss or guide 91, which, as shown in Fig. 9, may be formed integrally with one of the before-mentioned bars 78 and serves to guide one end of the screwed rod 41. This screwed rod is prevented from rotating independently of the cage 39 by a suitable feather 92, Fig. 8, fast to the said rod and engaging with a groove 93 in the before-mentioned boss 90. The pinions 83 84 are capable of engaging the nut 85, one through a left-handed clutch and the other through a right-handed clutch. A convenient arrangement of these clutches is that shown in the drawings, particularly Figs. 6, 8, 9, 11, and 12, which consists of the nut 85 being formed with two sets of ratchet-teeth 94 95, one set the reverse of the other, and the pinions 83 84, each having a cylindrical flange 96 encircling one set of the said ratchet-teeth, rollers 97 being interposed between the ratchet-teeth and respective surrounding flange 96.

The before-mentioned holes 2 3, Figs. 2, 13, 14, and 15, which are punched in the inset-web 1, are at a slightly-different distance apart than the peripheral distance between the holes 48 in the registering-cylinder 34, through which the sliding pins 49 50 operate, and the web 1 is so adjusted that when it is in its proper working position the hole 2 is slightly in arrear and the hole 3 is slightly in advance of the respective sliding pin 49 or 50, as shown in Fig. 13, wherein and in Figs. 14 and 15 the said pins are represented diagrammatically in different positions relatively to the holes 2 3.

The apparatus is provided with the necessary rollers 98 and 99, Figs. 1 and 2, for guiding the inset-web 1 around the registering-cylinder 34 and another roller, 100, for guiding the said web toward the main web 6, the inset-web 1 and main web 6 passing together from this roller direct to the cutting and folding mechanism.

In the operation of the before-described apparatus and so long as the inset-web 1 maintains its proper working position, and consequently presents its margins properly to the knife, neither of the holes 2 3 in the said web will register with its respective sliding pin 50 or 49, as shown in Fig. 13, the said pins being therefore retained in their retracted position out of reach of the respective star-wheels 79 80, which then move as if in one piece with the cage 39. When, however, the inset-web 1 is at the rear of this position, as indicated in Fig. 14, the hole 3 therein registers with the corresponding sliding pin 49, which by its spring 53 is immediately projected through the said hole, and consequently, through the further rotation of the registering-cylinder 34, as shown in Fig. 6, caused to turn the star-wheel 79 about its own axis in the direction indicated by the arrows adjacent to that wheel in Figs. 5, 6, and 7. This rotation of the star-wheel 79 about its own axis through the spur-wheel 81, pinion 83, and appropriate clutch 94 96 97 rotates the nut 85 in the direction of the arrows $a$ in Figs. 5, 6, and 7—that is to say, in the same direction as but at a quicker speed than the rotation of the cage itself. By these means the screwed rod 41 is moved toward the front of the machine, and thereby through the lever 27 and strap-shifter 26 moves the friction-strap 25 rearward—that is to say, toward the right of Fig. 2—so as to cause it to be nipped between a larger part of the conical pulley 23 and a smaller part of the pulley 22, and thereby cause the two roll-supporting cylinders 8 9 to rotate at an accelerated speed, and consequently accelerate the unwinding of the roll 7. The unwound portion of the web 1 is thus fed more quickly to the folding and cutting mechanism, and the hole 3 is thereby moved out of register with the then withdrawn registering pin 49, thus causing the normal condition of working to be restored.

When the inset-web 1 is in advance of its normal position, the hole 2 thereof registers with the corresponding sliding pin 50, which by its spring 53 is immediately projected through the said hole, and consequently through the further rotation of the registering-cylinder 34 caused to turn the star-wheel 80 about its own axis in the direction indicated by the arrows adjacent to that wheel in Figs. 5, 6, and 7. This rotation of the star-wheel 80 effects the rotation of the nut 85 in a manner almost identical with that already explained in connection with the star-wheel 79, the only difference being that the nut 85 is rotated in the opposite direction, owing to the pinion 84 being geared to the spur-wheel 82 through the intermediate wheel 86 instead of, as in the former case, the pinion 83 (which corresponds with the pinion 84) gearing directly with the spur-wheel 81. By these means the web 1 is fed to the folding and cutting mechanism at a slightly slower speed, the hole 2 being thereby moved out of register with the then withdrawn registering pin 50 and the normal condition of working being thus restored. The outward movement of the sliding pin 49 or 50 also brings the arm 55 of the appropriate three-armed lever 54 55 56 into operative contact with the stationary cam 44 and the pawl 59 into engagement with the crank-pin 61, so that by the rotation of the registering-cylinder 34 the sliding pin 49 or 50 is withdrawn into its normal position and the stationary cam 44, lever-arms 55 56, and pawl 59 cause the appropriate tumbler-disk 62 and the rotating cam 64, integral with that disk, to turn through their first ninety degrees, and thereby, as shown at the lower part of Fig. 7, bring the recess 66 of the tumbler-disk into position to engage the fixed stud or abutment 72. During this first ninety degrees of rotation the cam 64 by acting on the appropriate bell-crank lever 73 74 causes the arm 74 of such lever to move from a position such as that in which it is shown in Figs. 5 and 6 to a position such as that in which it is represented at the lower part of Fig. 7, in which position the said arm bears upon the lever-arm 56, and thereby through the arm 54 of the corresponding lever holds the appropriate pin 49 or 50 in its withdrawn position. When the further rotation of the registering-cylinder 34 brings this recess 66 up to the said fixed stud 72, the tumbler-disk 62 and rotating cam 64 are turned through their second ninety degrees, the last-named bell-crank lever 73 74 still remaining in contact with the three-armed lever 54, 55, and 56, and thereby retaining the sliding pin 49 or 50 in its withdrawn position. At the next rotation of the registering-cylinder 34 the recess 67 of the tumbler-disk 62 engages the fixed stud 72 and the said disk is turned through its third ninety degrees, the sliding pin still being retained in its withdrawn position, as during the last preceding ninety degrees of rotation. At the next ensuing rotation of the registering-cylinder 34 the recess 68 of the tumbler-disk 62 engages the fixed stud 72 and the said disk and the attached cam 64 are turned through their fourth ninety degrees, thus completing their rotation, at which stage the appropriate bell-crank lever 73 74 has released the three-armed lever 54 55 56 and sliding pin 49 or 50 and the mulilated portion 69 of the tumbler-disk 62 is turned outward, so that the latter will not be further operated until the last-named three-armed lever 54 55 56 shall next be brought into operative contact with the stationary cam 44 through the passage of the sliding pin 49 or 50 into its respective hole 3 or 2 in the inset-web 1.

The object of positively retaining the sliding pin 49 or 50 within the registering-cylinder 34 during parts of the rotation of the tumbler-disk 62 is to give the inset-web 1 sufficient time to adjust itself before allowing the said pin to again pass through the said web; but the proportion of such rotation during which the said retention is exercised may be varied according to requirements.

The before-described apparatus is capable of being variously modified without departing from the essential features of the invention. For example, although the sliding pins 49 50 are herein described as disposed on diametrically opposite sides of the axis of the registering-cylinder 34 and the two star-wheels 79 80 are described as correspondingly disposed on diametrically opposite sides of the axis of rotation of the cage 39 these devices may be arranged in any other desired manner so long as the correspondence between them is maintained and so long as the holes in the web are positioned to suit such arrangement.

I claim—

1. In means for controlling the unwinding of a roll of material in web form and having registering perforations distributed along its length, the combination of a rotating cylinder, in contact with whose periphery the web travels, a pin radially movable in the rotating cylinder, adapted to enter the perforations in the web, a roll-driving cylinder in peripheral driving contact with the roll of material for rotating the said roll, variable-speed gear operatively connected with the roll-driving cylinder, a device operatively connected with the variable-speed gear and adapted to be operated by the movable pin for varying the speed of rotation of the last-named cylinder, and a device operatively connected with the pin, adapted to withdraw it into its inoperative position.

2. In means for controlling the unwinding of a roll of material in web form and having registering perforations distributed along its length, the combination of a rotating cylinder in contact with whose periphery the web travels, a pin radially movable in the rotating cylinder, adapted to enter the perforations in the web, a roll-driving cylinder in peripheral driving contact with the roll of material for rotating the said roll, variable-speed gear operatively connected with the roll-driving cylinder, and a device operatively connected with the variable-speed gear and adapted to be operated by the movable pin for varying the speed of rotation of the last-named cylinder.

3. In means for controlling the unwinding of a roll of material in web form and having registering perforations distributed along its length, the combination of a rotating cylinder in contact with whose periphery the web travels, two pins radially movable in the rotating cylinder adapted to enter the perforations in the web, a roll-driving cylinder in peripheral driving contact with the roll of material for rotating the said roll, variable-speed gear operatively connected with the roll-driving cylinder, and a device operatively connected with the variable-speed gear and adapted to be operated by one of the movable pins for increasing, and by the other of such pins, for decreasing, the speed of the last-named cylinder.

4. In means for controlling the unwinding of a roll of material in web form, and having registering perforations distributed along its length the combination of a rotating cylinder in contact with whose periphery the web travels, two pins radially movable in the rotating cylinder, normally out of register with, and adapted to enter, the perforations of the web, a roll-driving cylinder in peripheral driving contact with the roll of material for rotating the said roll, variable-speed gear operatively connected with the roll-driving cylinder, and a device operatively connected with the variable-speed gear and adapted to be operated by one of the movable pins for increasing, and by the other of such pins, for decreasing, the speed of the last-named cylinder.

5. In means for controlling the unwinding of a roll of material in web form and having registering perforations distributed along its length, the combination of a rotating cylinder, in contact with whose periphery the web travels, a pin radially movable in the rotating cylinder, normally out of register with, and adapted to enter, the perforations of the web, a spring acting on the pin to project it outward from the cylinder, a lever pivoted to the cylinder, in operative connection with, and adapted to withdraw, the pin, and a cam adapted to act on the said lever for effecting such withdrawal.

6. In means for controlling the unwinding of a roll of material in web form and having registering perforations distributed along its length, the combination of a rotating cylinder, in contact with whose periphery, the web travels, a pin radially movable in the rotating cylinder, normally out of register with, and adapted to enter, the perforations of the web, a spring acting on the pin to project it outward into the perforations, a lever pivoted to the cylinder, in operative connection with, and adapted to withdraw, the pin, a cam adapted to act on the said lever for effecting such withdrawal, a cam pivoted to the cylinder, adapted to be rotated by the lever, and a second lever pivoted to the cylinder, in operative contact with the pivoted cam, and adapted to act on the first lever to retain the pin in its withdrawn position.

7. In means for controlling the unwinding of a roll of material in web form and having registering perforations distributed along its length, the combination of a rotating cylinder, in contact with whose periphery, the web travels, a pin radially movable in the rotating cylinder, normally out of register with, and adapted to enter, the perforations of the web, a roll-driving cylinder in peripheral driving contact with the roll of material for rotating it, variable-speed gear operatively connected with the roll-driving cylinder, a body adapted to rotate adjacent to the first-named cylinder, a star-wheel pivoted in the rotating body on an axis eccentric to the axis of rotation of the said body, the arms of the star-wheel traveling in the path pursued by the radially-projected pin, and a device operatively connecting the star-wheel with the variable-speed gear and adapted to effect the adjustment of the latter.

8. In means for controlling the unwinding of a roll of material in web form and having registering perforations distributed along its length, the combination of a rotating cylinder, in contact with whose periphery the web travels, a pin radially movable in the rotating cylinder adapted to enter the perforations of the web, a spring acting on the pin to project it outward into the perforations, a lever pivoted to the cylinder, in operative connection with, and adapted to withdraw, the pin, and a cam adapted to act on the said lever for effecting such withdrawal.

9. In means for controlling the unwinding of a roll of material in web form and having registering perforations distributed along its length, the combination of a rotating cylinder, in contact with whose periphery the web travels, a pin radially movable in the rotating cylinder, adapted to enter the perforations of the web, a spring acting on the pin to project it into the perforations, a three-armed lever pivoted to the cylinder, one arm in operative connection with, and adapted to withdraw, the pin, a cam adapted to act on a second arm of the lever for effecting such withdrawal, a pawl pivoted to the third arm of the lever, a cam pivoted to the cylinder, a crank-pin fast to this cam, adapted to be engaged by the pawl, a bell-crank lever of which one arm is engaged with the last-named cam and the other arm acts on the above-named third arm to retain the pin in its withdrawn position.

10. In means for controlling the unwinding of a roll of material in web form and having registering perforations distributed along its length, the combination of a rotating cylinder, in contact with whose periphery the web travels, a pin radially movable in the rotating cylinder, adapted to enter the perforations of the web, a spring acting on the pin to project it into the perforations, a three-armed lever pivoted to the cylinder, one arm in operative connection with, and adapted to withdraw the pin, a cam adapted to act on a second arm of the lever, for effecting such withdrawal, a pawl pivoted to the third arm of the lever, a cam adapted to effect the retention of the pin in its withdrawn position, and a crank-pin fast to this cam, adapted to be engaged by the pawl for rotating the said cam.

11. In means for controlling the unwinding of a roll of material in web form and having registering perforations distributed along its length, the combination of a rotating cylinder, in contact with whose periphery the web travels, a pin movable in the rotating cylinder, adapted to enter the perforations of the web, a spring acting on the pin to project it into the perforations, a three-armed lever pivoted to the cylinder, one arm in operative connection with, and adapted to withdraw the pin, a stationary cam adapted to act on a second arm of the lever, for effecting such withdrawal, a pawl pivoted to the third arm of the lever, a tumbler-disk pivoted to the cylinder, and having a mutilated periphery, notches in the said periphery, a crank-pin fast to the tumbler-disk, adapted to be engaged by the pawl to partially rotate the tumbler-disk, and a stationary abutment, in the path of the partially-rotated tumbler-disk, adapted to engage the notches thereof for completing the said rotation.

12. In means for controlling the unwinding of a roll of material in web form and having registering perforations distributed along its length, the combination of a rotating cylinder, in contact with whose periphery the web travels, a pin radially movable in the rotating cylinder, adapted to enter the perforations of the web, a spring acting on the pin to project it into the perforations, a lever pivoted to the cylinder, in operative connection with, and adapted to withdraw, the pin, a cam adapted to act on the said lever for effecting such withdrawal, a cam pivoted to the cylinder, a crank-pin fast to the said pivoted cam, adapted to be engaged by the above-named lever for partially rotating the said pivoted cam, a second lever pivoted to the cylinder in operative contact with the pivoted cam and adapted to act on the first lever to retain the pin in its withdrawn position, a mutilated and peripherally-notched tumbler-disk fast to the pivoted cam, and a fixed abutment located in the path of the partially-rotated tumbler-disk and adapted to engage the notches thereof.

13. In means for controlling the unwinding of a roll of material in web form and having registering perforations distributed along its length, the combination of a rotating cylinder, in contact with whose periphery the web travels, a pin radially movable in the rotating cylinder, adapted to enter the perforations in the web, a spring acting on the pin to project it into the perforations, a lever pivoted to the cylinder, in operative connection with, and adapted to withdraw, the pin, a cam adapted to act on the said lever for effecting such withdrawal, a cam pivoted to the cylinder, a crank-pin fast to the said pivoted cam, adapted to be engaged by the above-named lever for partially rotating the said pivoted cam, a second lever pivoted to the cylinder in operative contact with the pivoted cam and adapted to act on the first lever to retain the pin in its withdrawn position, a mutilated and peripherally-notched tumbler-disk fast to the pivoted cam, a fixed abutment located in the path of the partially-rotated tumbler-disk and adapted to engage the notches thereof, a grooved locking-ring fast to the rotating cam and tumbler-disk, and a yielding detent fast to the cylinder and adapted to engage the locking-ring.

14. In means for controlling the unwinding of a roll of material in web form and having registering perforations distributed along its length, the combination of a rotating cylinder, in contact with whose periphery the web travels, a pin radially movable in the rotating cylinder, adapted to enter the perforations in the web, a spring acting on the pin to project it into the perforations, a lever pivoted to the cylinder in operative connection with, and adapted to withdraw the pin, a cam adapted to act on the said lever for effecting such withdrawal, a roll-driving cylinder in peripheral driving contact with the roll of material for rotating it, variable-speed gear operatively connected with the roll-driving cylinder, a body adapted to rotate adjacent to the rotating cylinder, a star-wheel pivoted in the rotating body on an axis eccentric to the axis of rotation of the said body, the arms of the star-wheel traveling in the path pursued by the radially-movable pin, and a device operatively connecting the star-wheel with the variable-speed gear and adapted to effect the adjustment of the latter.

15. In means for controlling the unwinding of a roll of material in web form and having registering perforations distributed along its length, the combination of a rotating cylinder in contact with whose periphery the web travels, two pins radially movable in the rotating cylinder, adapted to enter the perforations in the web, springs acting on the pins to project them into the perforations, a lever pivoted to the cylinder in operative connection with, and adapted to withdraw, each of the pins, a cam adapted to act on the said lever for effecting such withdrawal, a roll-driving cylinder in peripheral driving contact with the roll of material for rotating it, variable-speed gear operatively connected with the roll-driving cylinder, a body adapted to rotate adjacent to the rotating cylinder, two star-wheels pivoted in the rotating body on axes eccentric to the axis of rotation of the said body, the star-wheels being adapted to contact each with its respective radially-projected pin, and a device operatively connecting the star-wheel with the variable-speed gear and adapted to effect the adjustment of the latter.

16. In means for controlling the unwinding of a roll of material in web form and having registering perforations distributed along its length, the combination of a rotating cylinder in contact with whose periphery the web travels, a pin radially movable in the rotating cylinder, adapted to enter the perforations in the web, a spring acting on the pin to project it into the perforations, a lever pivoted to the cylinder in operative connection with, and adapted to withdraw, the pin, a cam adapted to act on the said lever for effecting such withdrawal, a roll-driving cylinder in peripheral driving contact with the roll of material for rotating it, variable-speed gear operatively connected with the roll-driving cylinder, a body adapted to rotate adjacent to the rotating cylinder, a star-wheel pivoted in the rotating body on an axis eccentric to the axis of rotation of the said body, the arms of the star-wheel traveling in the path pursued by the radially-movable pin, a screw-threaded nut rotatable, without longitudinal motion, in the rotating body, two intermeshing gears one in operative engagement with the nut and the other fast to the star-wheel, a screw-threaded rod engaging with the nut and capable of longitudinal motion, and devices operatively connecting the screw-threaded rod with the variable-speed gear, and adapted to effect the adjustment of the latter.

17. In means for controlling the unwinding of a roll of material in web form and having registering perforations distributed along its length, the combination of a rotating cylinder, in contact with whose periphery the web travels, two pins radially movable in the rotating cylinder, adapted to enter the perforations in the web, springs acting on the pins to project them into the perforations, a lever pivoted to the cylinder in operative connection with, and adapted to withdraw each of the pins, a cam adapted to act on the said lever for effecting such withdrawals, a roll-driving cylinder in peripheral driving contact with the roll of material for rotating it, variable-speed gear operatively connected with the roll-driving cylinder, a body adapted to rotate adjacent to the rotating cylinder, two star-wheels pivoted in the rotating body on an axis eccentric to the axis of rotation of the said body, the arms of each star-wheel being adapted to contact with, always, the same one of the two pins, a screw-threaded nut rotatable without longitudinal motion, in the rotating body, two intermeshing gears one in operative engagement with the nut and the other fast to one of the star-wheels, a spur-gear fast to the other of the star-wheels, a spur-gear in operative engagement with the nut gearing with the last-named gear through an intermediate wheel, the said intermediate wheel, a shaft, supported in the rotating body, for the intermediate wheel, a screw-threaded rod engaging with the nut and capable of longitudinal motion, and devices operatively connecting the screw-threaded rod with the variable-speed gear, and adapted to effect the adjustment of the latter.

18. In means for controlling the unwinding of a roll of material in web form and having registering perforations distributed along its length, the combination of a rotating cylinder, in contact with whose periphery the web travels, two pins radially movable on diametrically opposite sides of the rotating cylinder and adapted to enter the perforations in the web, springs acting on the pins to project them into the perforations, levers pivoted to the cylinder, in operative connection with, and adapted to withdraw, the pins, a cam adapted to act on the said levers for effecting such withdrawal, a body adapted to rotate adjacent to the rotating cylinder, two star-wheels pivoted in the rotating body on diametrically opposite sides of the axis of rotation of the said body, shafts fast to the rotating cylinder and rotating body respectively, equal spur-gears fast on these shafts, and an intermediate spur-gear meshing with both of the said gears.

19. In means for controlling the unwinding of a roll of material in web form and having registering perforations distributed along its length, the combination of a rotating cylinder, in contact with whose periphery the web travels, two pins radially movable on diametrically opposite sides of the rotating cylinder and adapted to enter the perforations in the web, springs acting on the pins to project them into the perforations, two levers pivoted to the cylinder, each in operative connection with, and adapted to withdraw, one of the pins, a cam adapted to act on both of the said levers for effecting such withdrawal, a roll-driving cylinder in peripheral driving contact with the roll of material for rotating it, variable-speed gear operatively connected with the roll-driving cylinder, a body adapted to rotate adjacent to the rotating cylinder, two star-wheels pivoted in the rotating body on diametrically opposite sides of the axis of rotation of the said body, shafts fast to the rotating cylinder and rotating body respectively, equal spur-gears fast on these shafts, an intermediate spur-gear meshing with both of the said gears, and devices operatively connecting the star-wheels with the variable-speed gear and adapted to effect the adjustment of the latter.

20. In means for controlling the unwinding of a roll of material in web form and having registering perforations distributed along its length, the combination of a rotating cylinder, in contact with whose periphery the web travels, two pins radially movable on diametrically opposite sides of the rotating cylinder and adapted to enter the perforations in the web, springs acting on the pins to project them into the perforations, two levers pivoted to the cylinder, each in operative connection with, and adapted to withdraw, one of the pins, a cam adapted to act on both of the said levers for effecting such withdrawal, a roll-driving cylinder in peripheral driving contact with the roll of material for rotating it, variable-speed gear operatively connected with the roll-driving cylinder, a body adapted to rotate adjacent to the rotating cylinder, two star-wheels pivoted in the rotating body on diametrically opposite sides of the axis of rotation of the said body, a screw-threaded nut rotatable without longitudinal motion, in the rotating body, spur-gear operatively connecting the nut with both of the star-wheels, a screw-threaded rod engaging with the nut and capable of longitudinal motion, shafts fast to the rotating cylinder and rotating body respectively, equal spur-gears fast on these shafts, an intermediate spur-gear meshing with both of the said gears, and devices operatively connecting the screw-threaded rod with the variable-speed gear, and adapted to effect the adjustment of the latter.

21. In means for controlling the unwinding of a roll of material in web form and having registering perforations distributed along its length, the combination of a rotating cylinder, in contact with whose periphery the web travels, two pins movable in the rotating cylinder and adapted to enter the perforations in the web, a body adapted to rotate about an axis parallel with that of the rotating cylinder, two star-wheels pivoted in the rotating body to rotate in a plane perpendicular to the axis of rotation of the body, the arms of each star-wheel being adapted to contact with, always, the same one of the two pins, a screw-threaded nut rotatable, without longitudinal motion, in the rotating body, two clutches on the nut, two intermeshing gears one on one of the clutches and the other fast to one of the star-wheels, a spur-gear fast to the other of the star-wheels, a spur-gear fast to the second of the clutches gearing with the last-named gear through an intermediate wheel, the said intermediate wheel, a shaft, supported in the rotating body for the intermediate wheel, a screw-threaded rod engaging with the nut and capable of longitudinal motion, a roll-driving cylinder in peripheral driving contact with the roll of material for rotating it, variable-speed gear operatively connected with the roll-driving cylinder, devices operatively connecting the screw-threaded rod with the variable-speed gear, and adapted to effect the adjustment of the latter.

22. In means for controlling the unwinding of a roll of material in web form, the combination of a rotating body, two star-wheels pivoted in the rotating body to rotate in a plane perpendicular to the axis of rotation of the body, a screw-threaded nut rotatable, without longitudinal motion in the rotating body and in operative connection with both star-wheels, a screw-threaded rod engaging with the nut and capable of longitudinal motion, a main driving-shaft in geared connection with the rotating body, a roll-driving cylinder in peripheral driving contact with the roll of materal for rotating it, conical pulleys on the main driving-shaft and shaft of the roll-driving cylinder, the larger end of each pulley being opposite the smaller end of the other pulley, an endless belt nipped between the two pulleys, and a belt-shifter in operative connection with the screw-threaded rod for shifting the belt toward the larger or smaller end of either pulley.

23. In means for controlling the unwinding of a roll of material in web form, the combination of a rotating cylinder, in contact with the periphery of which the web travels, two protuberances on the periphery of the cylinder, a longitudinally-movable rod adapted to be moved longitudinally in opposite directions by the respective protuberances, a roll-driving cylinder and shaft, a main driving-shaft parallel with the roll-driving shaft, conical pulleys on the two said shafts, the larger end of each pulley being opposite the smaller end of the other of the pulleys, an endless belt nipped between the two pulleys, a belt-shifter adapted to move the belt toward the larger or smaller end of each pulley, and a lever operatively connecting the said belt-shifter with the above-named movable rod.

In witness whereof I have hereunto set my hand in the presence of two witnesses.

THOMAS M. NORTH.

Witnesses:
J. H. JOY,
S. R. G. PARKER.